United States Patent [19]

Dieterich et al.

[11] 4,189,850

[45] Feb. 26, 1980

[54] SELF-CENTERING VEGETABLE DRYING APPARATUS

[75] Inventors: Frank L. Dieterich, 3727 S. Robertson Blvd., Culver City, Calif. 90230; Stanton Abrams, Los Angeles, Calif.

[73] Assignee: Frank L. Dieterich, Culver City, Calif.

[21] Appl. No.: 913,557

[22] Filed: Jun. 8, 1978

Related U.S. Application Data

[63] Continuation-in-part of Ser. No. 794,556, May 6, 1977, Pat. No. 4,103,432.

[51] Int. Cl.[2] .............................................. F26B 17/30

[52] U.S. Cl. .................................. 34/58; 210/380 R; 233/1 C

[58] Field of Search ...................... 34/58, 8; 233/1 C; 210/363, 350, 356, 380, 369, 370, 378, 147, 144, 368

[56] References Cited

U.S. PATENT DOCUMENTS

| | | | |
|---|---|---|---|
| 827,024 | 7/1906 | Lee | 210/380 |
| 2,045,986 | 6/1936 | Gould | 210/380 X |
| 2,711,827 | 6/1955 | Smith | 210/147 |
| 2,784,500 | 3/1957 | Beaumont | 34/58 |
| 3,100,030 | 8/1963 | McMillan | 34/58 X |
| 3,300,871 | 1/1967 | O'Conor | 34/58 |
| 3,827,985 | 8/1974 | Haan et al. | 210/380 X |
| 3,885,321 | 5/1975 | Fouineteau | 34/58 |
| 4,090,310 | 5/1978 | Koff | 34/58 |

FOREIGN PATENT DOCUMENTS

| | | | |
|---|---|---|---|
| 574551 | 4/1959 | Canada | 34/58 |
| 8114 | of 1904 | United Kingdom | 210/369 |

*Primary Examiner*—William E. Wayner
*Assistant Examiner*—Harold Joyce

[57] ABSTRACT

An apparatus for drying lettuce and other vegetables including a basket in which wet lettuce is placed, a holder in which the basket is removably received, and a motor for rotating the basket and holder. When the basket is rotated to expel water through openings in its sidewalls by centrifugal force, the sidewalls bend outwardly to engage the holder and center the basket.

The holding mechanism is normally held against rotation by a brake. When the motor is energized, current flows through the brake to release it. As a safety feature, no power is applied to the motor and brake circuits when the device is not in operation.

13 Claims, 4 Drawing Figures

DRAIN

SELF-CENTERING VEGETABLE DRYING APPARATUS

CROSS-REFERENCE TO RELATED APPLICATIONS

This is a continuation-in-part of application Ser. No. 794,556, entitled VEGETABLE DRYING APPARATUS, filed on May 6, 1977, now U.S. Pat. No. 4,103,432.

BACKGROUND OF THE INVENTION

The present invention relates to an apparatus for drying vegetables, particularly lettuce.

In the course of preparing vegetables, it is frequently necessary to dry them before they are refrigerated or served. Cut lettuce, in particular, is customarily treated with ice water so that it will be fresh and crisp when used later in salads and should be partially dried so that salad dressing will not run off the leaves too quickly, but some moisture should be retained to make the lettuce more palatable.

In the past, lettuce has been dried by placing it in a perforated basket that is shaken or rotated, either manually or by an electric motor, the use of a motor being preferable, particularly for commercial applications. Previously known vegetable dryers are often difficult to clean, since they have numerous corners and crevices that are not easily accessible. A thorough cleaning and sanitizing usually requires that a skilled person disassemble the device, using appropriate tools. Cleaning is, therefore, a time-consuming process and may tend to be done with less frequency than is desirable for food-handling equipment, particularly in the case of a motorized dryer with a more complex structure. It is, therefore, preferable to provide a dryer having a removable but rotatable basket to facilitate cleaning. A problem arises, however, in that a removable basket tends to shift off-center, producing excessive vibration. Moreover, if the basket is plastic, which is preferable from the point of view of cost and ease of sanitization, and if it is not properly centered and supported, it tends to deform under centrifugal force. This deformation tends to exaggerate any out-of-balance condition and may induce excessive vibration.

Motor-driven dryers are equipped with clutches for controlling the rotation of the vegetable container. These clutch mechanisms are sometimes of a type that can easily injure the hands of the operator and present a particularly high risk of injury when the device is being cleaned. Another dangerous aspect of previously known vegetable dryers is the use of upstanding lugs that engage and rotate a removable basket. If the dryer is turned on after the basket is removed, the rotating lugs become a likely source of injury.

The objective of the present invention is to provide a safe, simple, convenient, easily sanitized and easy to operate apparatus for drying lettuce and other vegetables that can be readily used in restaurants and other food preparation facilities. Another objective is to provide such an apparatus employing a removable basket that is self-centering.

SUMMARY OF THE INVENTION

The present invention provides a vegetable-drying apparatus that uniquely achieves the foregoing objectives. It includes a removable basket for the vegetables having flexible sidewalls that bend outwardly under centrifugal force as the basket is rotated. A holder that slidably recieves the basket is engaged by the basket sidewalls as they bend outwardly, thereby centering the basket within the holder and preventing it from getting out of round or escaping from the holder. Rotation of the basket to drive water out through the sidewalls by centrifugal force is accomplished by a motor connected to the holder.

In a preferred form of the invention, the basket is plastic and of circular cross-section, the openings forming elongated slots parallel to its axis of rotation. These slots define parallel vertical bands on the sides of the basket that are capable of bending outwardly in the required manner. The basket can be provided with other openings, in addition to the slots, to permit the water to escape more rapidly.

The holder may be in the form of a generally cylindrical, open-topped, metal drum. Water escapes from the drum through drain holes and side openings.

According to another aspect of the invention, a flywheel that stabilizes the rotation of the holder and basket also cooperates with a brake. A spring biases a brake shoe toward a flywheel engaging position to arrest rotation of the basket, but is moved electro-magnetically against the force of the spring toward a disengaged position when the motor is energized. When the motor is de-energized and the spring causes the brake to be engaged, there is no current flowing in the brake or motor circuits. The danger of an electric shock is, therefore, minimized. A timer can be included to ensure that the preformance of the device is predictable and repeatable.

Other features and advantages of the present invention will become apparent from the following detailed description of a preferred form thereof and the attached drawing which illustrates, by way of example, the principles of the invention.

DESCRIPTION OF THE PREFERRED EMBODIMENT

Figures 1, 1A, 2:
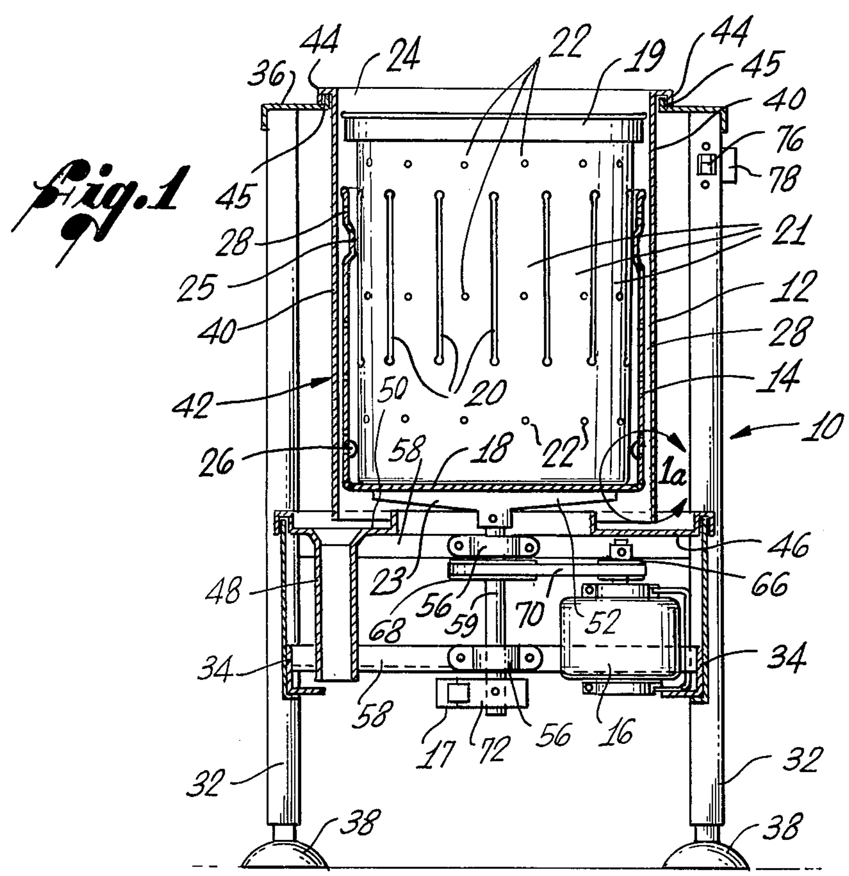
FIG. 1 is a partially cross-sectional view of a vegetable-drying apparatus constructed in accordance with the present invention.
FIG. 1*a* is an enlarged, fragmentary view of a portion of the apparatus indicated generally by the arrow A—A in FIG. 1.
FIG. 2 is a top view of the apparatus.
Figure 3:
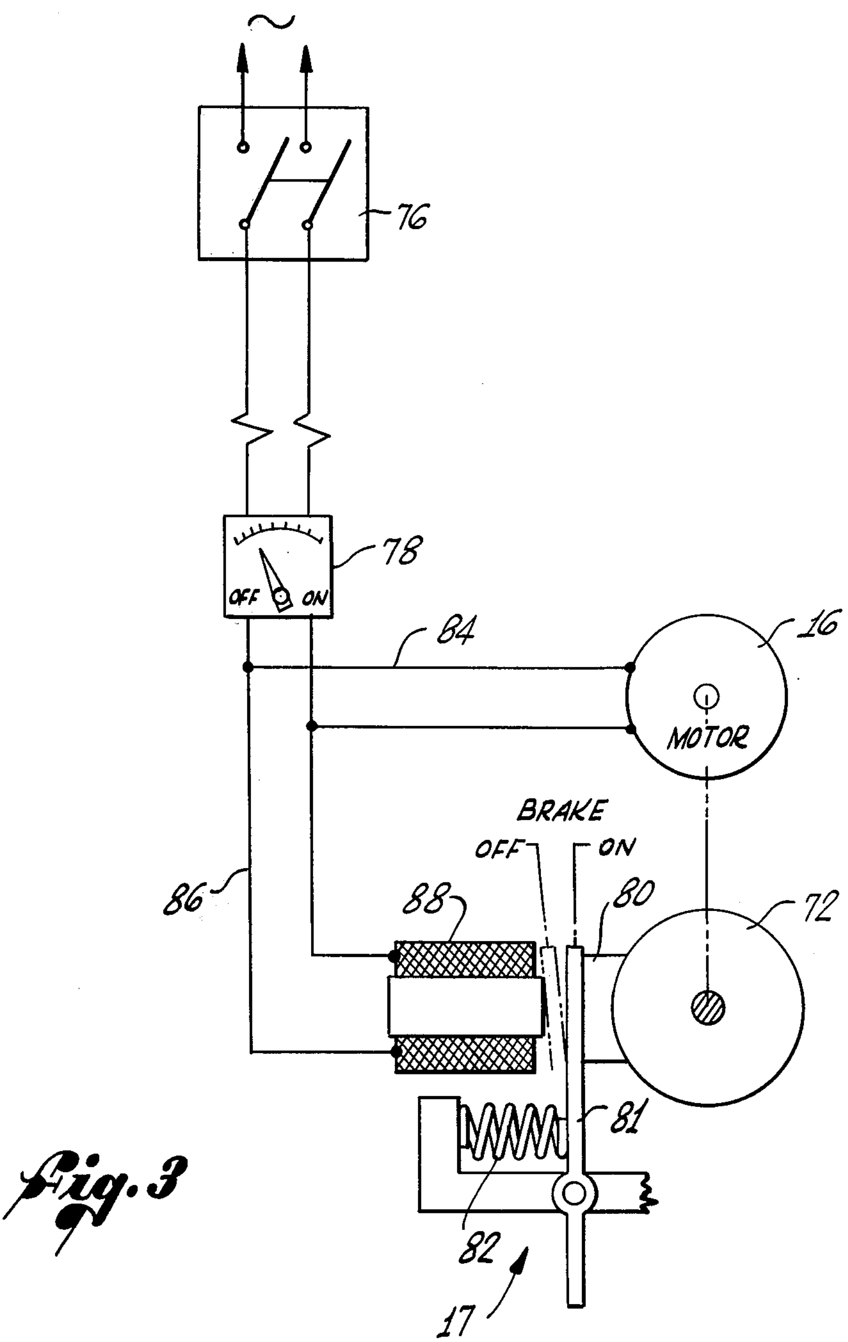
FIG. 3 is a schematic representation of the brake, motor and accompanying control circuitry.

The novel features of the present invention are embodied in an exemplary vegetable-drying apparatus, illustrated in FIGS. 1 through 3 of the accompanying drawings. It includes a stand 10, a drum-shaped holder 12 rotatably supported on the stand, a basket 14 received by the drum, a motor 16 for rotating the drum and basket, and a brake 17 for arresting rotation of the drum and basket.

The basket 14 is molded of polypropylene plastic, which is easily sanitized, well recognized as suitable for use in food-handling equipment, and sufficiently flexible for present purposes. Being approximately cylindrical, the basket 14 has a flat bottom 18, an open top end 19 and is slightly tapered inwardly toward the bottom after the manner of an inverted truncated cone for ease of insertion in the drum 12, as shown in FIGS. 1 and 2 (the taper being imperceptible in the drawings). In cross-section, the basket is circular.

A plurality of evenly spaced substantially vertical elongated openings or slots 20 extend up the sides of the basket 14 approximately parallel to its rotational axis, although at a small angle to the axis due to the taper of the basket. The sides are thus divided into relatively narrow, vertical, adjacent bands 21. Additional openings in the sides of the basket 14 are formed by three horizontal rows of smaller round perforations 22.

The drum 12, which is made of stainless steel, is also generally cylindrical, with a flat bottom 23 and an open top 24, and slidably receives the basket 14. An annular portion of the sidewalls of the drum 12 forms a ring-shaped protrusion 25 that is radially offset toward the center. The sides of the basket 14 come close to the ring 25 but leave a small clearance.

Near the bottom of the drum 12 are a plurality of inwardly projecting buttons 26 that contact the sides of the basket 14 when it is inserted between them. Drain holes 27 are provided about the circumference of the drum bottom 23 (FIG. 1*a*) and additional openings 28 that allow water to escape under centrifugal force are provided in three horizontal rows on the sides of the drum 12.

When the drum 12 is rotated, the bands 21 that form part of the basket sidewalls flex outwardly under centrifugal force to engage the ring 25. Since the bands 21 are all of equal flexibility, they each bend an equal amount and, therefore, hold the basket 14 in the center of the drum 12 and prevent it from getting out of round or escaping from the drum during rotation. The bending of the bands 21 also causes the slots 20 to widen, particularly at their centers, so that water carried by the lettuce can escape through the slots as well as the perforations 22. Centrifugal force also causes water to be expelled from the drum 12 through its drain holes 27 and sidewall openings 28.

The function of the ring 25 is to hold the sides of the basket 14 at a fixed distance from the sides of the drum 12, allowing a generally annular space between the basket and the drum to provide a path for the escaping water. This feature of the invention can be omitted to reduce manufacturing cost since a smaller but adequate path will exist in the absence of the ring 25 due to the bowed configuration of the basket 14 during rotation.

The stand 10 on which the drum 14 is supported has four equally-spaced, elongated legs 32 at its corners that are connected intermediate their ends by horizontal braces 34 and at the top by an open frame 36. Suction cups 38 at the bottom ends of the legs 32 securely position the apparatus on any suitable flat surface. Four integrally formed, slidably removable, polypropylene plastic panels 40 extend vertically between the legs 32 to form a shield 42 that surrounds the drum 12. Water expelled from the drum 12 is thus confined by the shield 42. The corners of the shield 42 where the panels 40 meet are rounded for ease of sanitization and cleaning. Alternatively, a cylindrical splash shield may be employed.

To position the shield 42, a downturned lip 44 extends about its outer top edge and engages an upstanding flange 45 on top of the frame 36. Since the shield 42 is received by the stand 10 without any fastening device, it can be freely removed for cleaning without using tools. The basket 14 can be removed from the drum 12 through the large center opening of the frame 36 and becomes a convenient container to store or serve the lettuce after processing.

A drip pan 46, made up of channel-shaped members connected end-to-end to form the sides of a square, is positioned beneath the lower edges of the shield 42 to collect the water that runs off, and a drain spout 48 in the pan floor 50 can be connected to a waste pipe or holding tank (not shown).

A disk-shaped horizontal turntable 52 is centrally located between the legs 32 and rotatably mounted atop a vertical drive shaft 54. Bearings 56 that position the shaft 54 are mounted on two vertically spaced, horizontal cross-pieces 58 that extend between the braces 34, or between opposite sides of the drip pan 46. The bottom 23 of the drum 12 is permanently attached to the top of the turntable 52 for rotation with the turntable.

The electric motor 16 is attached to one of the legs 32 and drives the shaft 54 via two speed-reducing pulleys 66 and 68 and a V-belt 70, thereby supplying the power to rotate the basket 14, drum 12 and turntable 52. To stabilize the shaft 54 and eliminate vibrations attributable to any unbalanced loading of the basket 14, a flywheel 72 is attached to the lower end of the shaft 54 below the cross-pieces 58. The weight of the flywheel 72 should be at least equal to that of the basket 14, plus its contents.

Rotation of the basket 14 can be halted by the brake 17 which is attached to one of the cross-pieces 58. The motor 16 and the brake 17 are controlled by a main switch 76 and an adjustable timer 78 in series with the main switch is mounted on one of the legs 32. When the main switch 78 is closed, the dryer is operated by simply setting the timer 78 to the number of seconds of rotation desired.

The brake 17, as shown schematically in FIG. 3, includes a brake shoe 80 attached to the end of a pivotable arm 81 that is biased by a brake spring 82 against the circumferential outer edge of the flywheel 72. Frictional engagement of the brake shoe 80 with the flywheel 72 prevents rotation. Accordingly, the flywheel 72 performs the double function of stabilizing the rotation of the basket 14 and interacting with the brake shoe 80 to arrest rotation of the basket. This use of one component to perform two functions reduces the size, weight, cost and complexity of the dryer.

When a current is supplied through the main switch 76 and the timer 78 to a motor circuit 84, it is simultaneously supplied to a parallel brake circuit 86, energizing a coil 88 which electro-magnetically attracts the brake shoe 80 away from the flywheel 72 to permit rotation. The inclusion of the timer 78 is important since it permits the lettuce to be dried to a predetermined extent and each successive lettuce batch is dried for the same time period without the variations in drying time that would result if the operator's judgement were relied upon in this respect.

It should be noted that when the dryer is not in operation, no current passes beyond the timer 78, even though the brake 17 is applied, and the danger of electrical shock to persons loading or unloading the device is greatly reduced or eliminated despite the typically wet environment in which it is used. The main switch 76 can be opened to further reduce the danger of shock when, for instance, the dryer is being cleaned, to prevent current from passing to the timer 78.

The optimum speed of rotation and drying time can vary from a matter of seconds to a few minutes, depending upon such factors as the size of the basket 14, the wetness of the lettuce, and the degree of drying desired. It should be noted that the term "drying" as used herein does not necessarily imply removing all the water from the lettuce since it is generally desirable to allow water to remain making the lettuce more palatable and assisting in the retention of salad dressing. By way of example, good results have been achieved by rotation a twenty-inch diameter basket for 45 seconds at a speed of 600 r.p.m. The relatively short processing time permits lettuce removed from cold storage to be dried before its temperature rises objectionably.

It should be apparent from the foregoing that the invention provides a safe, convenient, easily sanitized, and self-centering apparatus for quickly drying lettuce and other vegetables. It should be highly desirable for restaurant use. While a particular form of the invention has been illustrated and described, it will be apparent from the foregoing that various modifications can be made without departing from the spirit and scope of the invention.

We claim:

1. An apparatus for drying vegetables comprising: a plastic basket for containing the vegetables to be dried, said basket being of circular cross section, having an open top end, a closed bottom end and a sidewall that tapers toward said bottom end, said sidewall being divided by slots into generally vertical elongated bands capable of bending outwardly under centrifugal force, thereby increasing the diameter of said basket and permitting water to escape from said basket;

a rotatable holder for removably receiving said basket with a space between said holder and said basket through which water expelled from said basket under centrifugal force can escape, said holder being dimensioned to be engaged by said bands upon outward bending thereof;

motor means connected to said holder for rotating said holder and said basket and thereby causing water to be expelled through said openings in said sidewall by centrifugal force.

2. The apparatus of claim 1 wherein said holder is a generally cylindrical metal drum.

3. The apparatus of claim 2 wherein said drum includes a radially inwardly protruding ring positioned for engagement by said bands upon outward bending of said bands.

4. The apparatus of claim 2 wherein said drum has openings therein to permit the escape of water therefrom, and said apparatus further comprises a splash shield surrounding said drum.

5. The apparatus of claim 1 wherein said holder is a generally cylindrical metal drum having a bottom on which said basket rests and an open top through which said basket is slidably received.

6. The apparatus of claim 1 further comprising brake means for arresting rotation of said holder and said basket.

7. The apparatus of claim 6 further comprising a brake spring for biasing said brake means toward a rotation arresting position and electro-magnetic means for moving said brake means against the force of said spring when energized.

8. The apparatus of claim 7 further comprising circuit means for simultaneously energizing said motor means and brake means.

9. The apparatus of claim 1 further comprising means for centering said basket in said holder prior to rotation thereof, including radially inwardly projecting buttons carried by said holder for engaging said basket.

10. The apparatus of claim 1 wherein said holder is rigid and concentric with said basket.

11. The apparatus of claim 1 wherein said holder includes means for engagement with said basket upon expansion of said basket.

12. The apparatus of claim 1 wherein said holder includes an inwardly projecting ring for engagement by said basket.

13. An apparatus for drying vegetables comprising:

a plastic basket of circular cross-section for containing vegetables to be dried, said basket having tapered but approximately vertical sidewalls divided by elongated approximately vertical slots into a plurality of approximately parallel outwardly bendable bands;

a generally cylindrical drum having an open top end and dimensioned to slidably receive said basket therein and to be engaged by said bands upon outward bending thereof;

a plurality of buttons projecting inwardly from said drum near the bottom thereof to position said basket;

motor means connected to said drum for rotating said drum and said basket, thereby causing water to be driven from said basket and causing said bands to bend outwardly under centrifugal force;

brake means for arresting rotation of said basket and said drum;

a brake spring biasing said brake means toward a rotation arresting position;

electro-magnetic means for moving said brake means against the force of said spring when energized; and means for simultaneously energizing said motor means and said brake means.

* * * * *